United States Patent [19]
Thompson

[11] Patent Number: 5,251,203
[45] Date of Patent: Oct. 5, 1993

[54] HUB PRIVACY FILTER FOR ACTIVE STAR CSMA/CD NETWORK

[75] Inventor: Geoffrey O. Thompson, Palo ALto, Calif.

[73] Assignee: Xerox Corporation, Rochester, N.Y.

[21] Appl. No.: 812,275

[22] Filed: Dec. 23, 1991

[51] Int. Cl.⁵ .................. H04L 12/26; H04B 17/02
[52] U.S. Cl. .................... 370/13.1; 370/85.3; 370/94.1; 370/94.3; 375/3.1; 375/10; 371/20.2; 340/825.07; 340/825.52
[58] Field of Search ........... 370/13, 13.1, 60, 85.2, 370/85.3, 91, 92, 93, 94.1, 94.2, 94.3, 97; 375/3, 3.1, 4, 10, 118, 119, 120; 178/70 R; 379/4.18; 455/7, 9; 340/825.02, 825.06, 825.07, 825.5, 825.51, 825.52; 371/20.1, 20.2, 20.4, 20.5; 380/6, 9, 68, 49

[56] References Cited

U.S. PATENT DOCUMENTS

| | | | |
|---|---|---|---|
| 4,063,220 | 12/1977 | Metcalfe et al. | 370/85.3 |
| 4,099,024 | 7/1978 | Boggs et al. | 178/71 R |
| 4,459,589 | 7/1984 | Ito | 340/825.52 |
| 4,500,990 | 2/1985 | Akashi | 370/85.3 |
| 4,531,238 | 7/1985 | Rawson et al. | 375/3 |
| 4,809,362 | 2/1989 | Claus et al. | 340/825.02 |
| 4,901,348 | 2/1990 | Nichols et al. | 370/60 |
| 4,922,486 | 5/1990 | Lidinsky et al. | 370/60 |
| 4,998,247 | 3/1991 | Irvine-Halliday et al. | 370/94.1 |
| 5,027,347 | 6/1991 | Malkki | 370/94.3 |
| 5,115,449 | 5/1992 | Lockyer et al. | 375/3 |
| 5,124,984 | 6/1992 | Engel | 370/85.3 |
| 5,161,192 | 11/1992 | Carter et al. | 375/3 |
| 5,164,960 | 11/1992 | Wincn et al. | 375/10 |
| 5,177,788 | 1/1993 | Schanning et al. | 380/49 |

Primary Examiner—Douglas W. Olms
Assistant Examiner—Alpus H. Hsu
Attorney, Agent, or Firm—Oliff & Berridge

[57] ABSTRACT

A logic section is provided on each port of an active repeater unit in a CSMA/CD network for comparing the destination address of a data packet retransmitted by the active repeater unit with the address of the data station attached to that port to determine whether a match occurs between these two addresses. Each port's transmitter receives the retransmitted data packet and a clock signal while the logic section is determining whether an address match occurs. The transmitter transmits the data packet to its corresponding data station until the logic section makes its determination. If a match occurs between the destination address of the retransmitted data packet and the address of the data station attached to that port, the logic section controls the transmitter so that the transmitter continues to transmit the data packet to its data station. If no match occurs, the logic section controls the transmitter so that the transmitter switches from transmitting the data packet to transmitting the clock signal.

6 Claims, 4 Drawing Sheets

HUB PRIVACY FILTER FOR ACTIVE STAR CSMA/CD NETWORK

BACKGROUND OF THE INVENTION

1. Field of the Invention

The present invention is directed to local area data communications networks, and in particular to active repeater units for use in star-configured carrier sense medium access collision detection (CSMA/CD) type networks having the characteristic that all traffic on the network medium can be seen by any station connected to the network. This invention is particularly directed to networks governed by the ANSI/IEEE 802.3 standards.

2. Description of Related Art

CSMA/CD networks such as 10BASET-type networks can include one or more active repeater units to which a plurality of data terminal equipment units (DTEs) are attached. Each DTE is attached to a corresponding port of the active repeater unit. The DTEs communicate with one another by sending data transmissions (referred to as "data packets") to the active repeater unit. The active repeater unit then retransmits this data packet through all of its other ports to the other DTEs attached to that active repeater unit. Each packet of data includes information identifying the DTE to which it is addressed (this information is known as the "destination address" of the data packet). When a data packet reaches a DTE, interface structure associated with the DTE determines whether the destination address of the received data packet corresponds to the address of that DTE. If a match occurs, the data contained within the data packet is conveyed onward to the DTE. If no match occurs, the data packet is disregarded.

A problem with this access method is that the filtering function of the DTE interface can be bypassed (since the DTE and its interface are located where users have access to them) so that the data contained in a data packet can be read by devices other than the DTE to which the packet is addressed. This feature can result in authorized users of the network having access to information conveyed on the network which was not intended to be transmitted to those users. Additionally, once an unauthorized device accesses the network, it can see all traffic transmitted through the network (even though none of that traffic is addressed to that unauthorized device).

Accordingly, it is desirable to prevent data addressed to one DTE from reaching other DTEs in the network. One way to do this would be to somehow transmit data packets only through an active repeater port attached to the DTE having an address corresponding to the destination address of the transmitted data packet. However, CSMA/CD network protocols require that all DTEs on the network "know" when other DTEs are using the network. One of the protocols in CSMA/CD networks requires idle DTEs (DTEs which are not transmitting data packets) to refrain from attempting to transmit data on the network when other DTEs are transmitting on the network. This is required because when more than one DTE attempts to transmit on the network, a collision occurs in the active repeater unit. This collision causes the active repeater unit to generate a jam signal that causes all transmitting DTEs to stop transmitting. The previously transmitting DTEs then attempt their transmission at a later time. Currently, DTEs in CSMA/CD-type networks determine whether other DTEs are transmitting on the network based upon sensing the transmission of data packets through the network (which, as described above, are transmitted through all ports of the active repeater unit to all DTEs on the network).

Accordingly, some type of signal must be substituted for data packets (when it is not desired to transmit the data packet to a DTE), so that all DTEs sense that the network is currently being used by another DTE.

Another requirement for any addition to a CSMA/CD-type network is that it be capable of operating with minimal data packet buffering. While some networks store entire data packets (for retransmission at a later time), the CSMA/CD protocols do not permit buffering on a data packet basis. Although some buffering (3 or 4 bits) occurs in the active repeater unit of these networks (in order to compensate for different transmission frequencies of different DTEs on the network), buffering on a packet basis is not acceptable in these networks. The maximum amount of buffering acceptable is in the range between about 4 and 14 bits. The reason for this should be apparent, since the storage of data packets would interfere with the collision-detection operations described above.

While a number of patents exist for providing some type of security function in some networks, none of these patents disclose filters for selectively transmitting data packets through repeater ports of CSMA/CD type networks such as ETHERNET-type networks.

U.S. Pat. No. 4,901,348 to Nichols et al discloses a security arrangement for securing data transmissions to and from one data device among a plurality of date devices sharing a common interface. The interface comprises a data processor for processing incoming and outgoing data transmission, a selective routing and transmission controller for generating a jamming signal, and a transmit/receive regulator associated with each device for discriminately inhibiting or enabling a data transmission to or from associated data devices. Data packets are only received by the data device having the appropriate destination address. When a data device transmits, other data devices cannot "eavesdrop". When a specific data device is receiving or transmitting a packet, all other data devices receive a "jamming" signal.

The device disclosed in U.S. Pat. No. 4,901,348 requires buffering on a data packet basis. Accordingly, it is not capable of operating transparently in the single access domain of ETHERNET-type networks.

U.S. Pat. No. 4,998,247 to Irvine-Halliday et al discloses an active star configured LAN having a selective broadcast capability such that a node may transmit a packet directly to one other node or to all nodes accessing a specific hub without any of the remaining network nodes being aware of the transmission. As discussed above, DTEs of ETHERNET-type networks must sense when other devices are accessing the network medium so that they do not attempt to access the network, and thus cause a collision to occur.

U.S. Pat. No. 4,922,486 to Lidinsky et al discloses a metropolitan area network (MAN) which provides a security feature by storing a user ID/port pairing in memory, and then comparing the pairings located in the headers of transmissions with stored pairings in order to authenticate each transmission.

U.S. Pat. No. 5,027,347 to Malkki discloses an intercom system comprising a central unit and a plurality of remote stations connected to the central unit by two-way lines into a network with a star configuration. Connection is established between two or more lines via the central unit in response to selection information received from a remote station. This patent relates to intercom systems which convey analog speech signals therethrough, not digital data packets.

Other background art of interest includes U.S. Pat. Nos.: 4,531,238 to Rawson et al, which discloses collision detection features in an active repeater-like device usable in an ETHERNET system; 4,099,024 to Boggs et al, which discloses a repeater for connecting two segments of a bidirectional communications network; 4,063,220 to Metcalfe et al, which discloses a communications network (without an active repeater) that operates using the CSMA/CD protocols; 4,459,589 to Ito; and 4,809,362 to Claus et al. For additional information relating to networks operating in accordance with the CSMA/CD access method, also see ANSI/IEEE standards 802.3, in particular, sections 4, 9 and 14.

The above standards, as well as the U.S. patents cited above are incorporated herein by reference for purposes of background.

OBJECTS AND SUMMERY OF THE INVENTION

It is an object of the present invention to provide a security feature for the ports of an active repeater unit, in a network operating under the carrier-sense-medium-access/collision-detection protocols, which filters data packets received and retransmitted by the active repeater unit so that the retransmitted data packets are only transmitted through ports attached to data stations to which the data packets are addressed, while outputting a spurious carrier signal through the other active repeater ports.

It is another object of the present invention to perform a data packet filtering operation in real-time, without data-packet-buffering so as not to adversely affect the topology of the CSMA/CD network.

It is a further object of the present invention to provide active repeater ports which are selectively operable between a filtering mode where transmitted data packets are filtered, and a learn mode where the address of the data station attached to a port is stored in a memory of that port for use in the filtering mode.

To achieve the foregoing and other objects, and to overcome the shortcomings discussed above, a logic section is provided on each active repeater port for comparing the destination address of a data packet retransmitted by the active repeater unit with the address of the data station attached to that port to determine whether a match occurs between these two addresses. Each port's transmitter receives the retransmitted data packet and a spurious carrier signal while the logic section is determining whether an address match occurs. The transmitter transmits the data packet to its corresponding data station until the logic section makes its match determination. If a match occurs between the destination address of the retransmitted data packet and the address of the data station attached to that port, the logic section controls the transmitter so that the transmitter continues to transmit the data packet to its data station. If no match occurs, the logic section controls the transmitter so that the transmitter switches from transmitting the data packet to transmitting the spurious carrier signal.

Each port of the active repeater unit is also operable in a learn mode where the address of the data station attached to each port is stored in a memory used by that port's logic section. The data station address is stored by storing the source address of a data packet transmitted by the data station through its port.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

While the invention is described in some detail hereinbelow with reference to a single illustrated embodiment, it is understood that there is no intent to limit it to that embodiment. On the contrary, the aim is to cover all modifications, alternatives and equivalents falling within the spirit and scope of the invention as defined by the appended claims.

Figure 1:
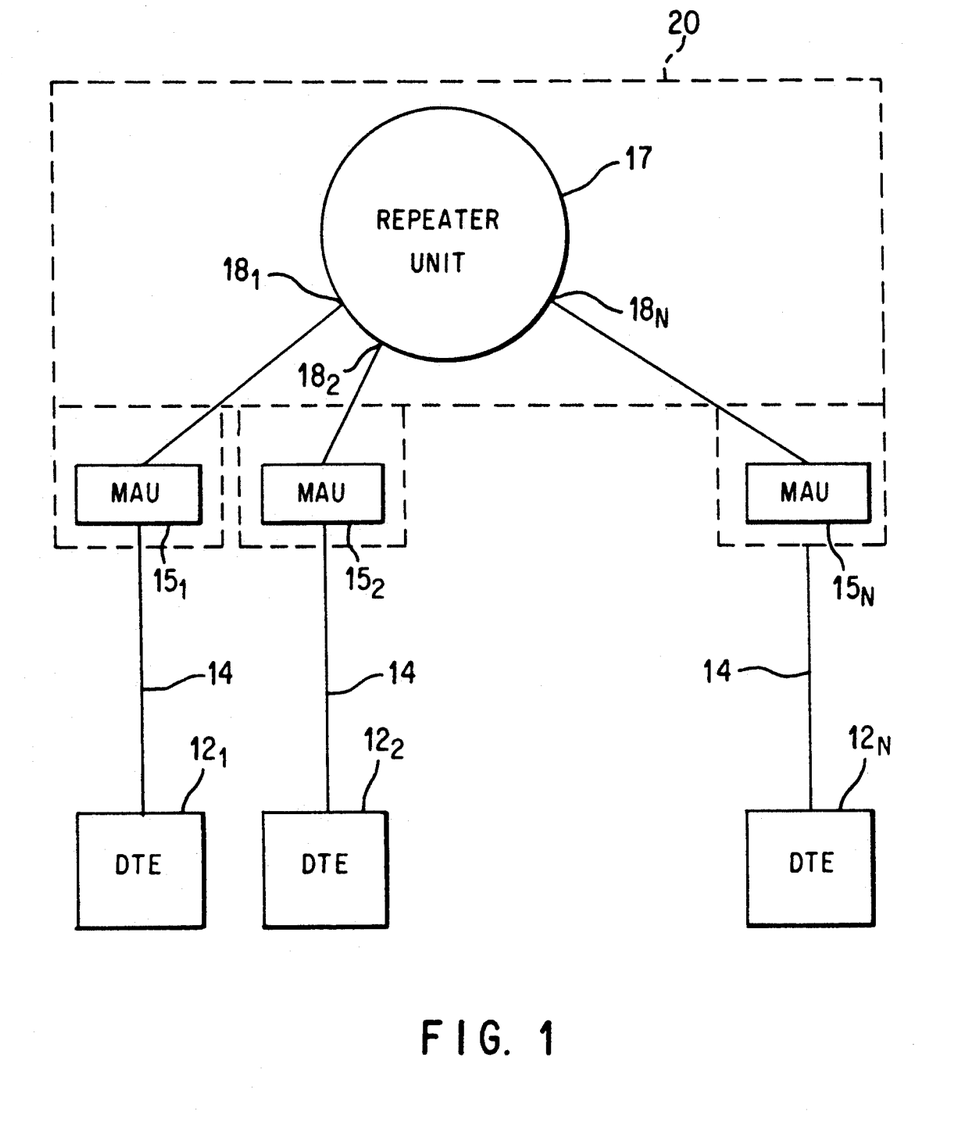
FIG. 1 is a simplified block diagram of a star configured communications network.

FIG. 1 illustrates a star configured network including a plurality of data terminal equipment (DTE) units $12_1$, $12_2 \ldots 12_N$ attached to an active repeater unit 17. The DTEs can be, for example: personal computers; work stations; shared resources, such as printers and file servers; and/or other types of processing stations. Active repeater unit 17 includes a plurality of by-directional ports $18_1$, $18_2 \ldots 18_N$, each port being attached to a respective DTE through a medium access unit (MAU) $15_1$, $15_2 \ldots 15_N$. The MAUs 15 are attached to the DTEs by any suitable communications medium 14 such as, for example, twisted pair or fiber optic cables. Each MAU (also known in the art as a transceiver) attaches a corresponding DTE to the active repeater unit 17. The MAUs can be provided separately from the active repeater unit 17, or can be purchased as an integral unit with an active repeater unit, referred to as an active concentrator 20. When the MAUs are separate from the active repeater unit, an access unit interface (AUI) is generally required between the MAU and the active repeater unit port. For purposes of the present description, the combination of an active repeater unit 17 and one or more MAUs is referred to as an active concentrator regardless of whether the MAUs are integral with or separate from the active repeater unit.

As is known in the art, in CSMA/CD communications networks, active repeater units receive data packets from the DTEs (via a port attached to a DTE) and retransmit these data packets to all DTEs attached to the active repeater unit except the DTE which originally transmitted the data packet. (That is, the active repeater unit receives a data packet through one port and then retransmits the data packet through all other ports to all other DTEs on the network). If two or more DTEs attempt to transmit data packets simultaneously, the active repeater unit detects this simultaneous transmission attempt (known as a collision) and sends a "jam signal" (instead of either data packet) to the DTEs on the network. The jam signal is a spurious regular signal such as, for example, alternating 1s and 0s. Each DTE then stops transmitting its data packet and attempts to retransmit the data packet at a randomly selected later time. See, for example, the above incorporated U.S. Pat. No. 4,531,238 to Rawson et al for a description of the active repeater collision detection logic.

The present invention provides logic in each port of the active repeater unit which: (a) enables a port to "learn" the address of the DTE attached thereto; and (b) prevents a port from transmitting at least the data communication portion of a data packet to its corresponding DTE if the data packet being transmitted through the network is not addressed to that corresponding DTE. The port logic results in a spurious signal being transmitted to its corresponding DTE (instead of the data) if the destination address of a data packet does not match the address of the DTE attached to the port. Thus, the DTE continues to see carrier (the spurious signal), even if the transmitted data packet is being blocked. Accordingly, the present invention does not affect the carrier access properties of the network. Additionally, since the present invention accomplishes this data packet address analysis in real time, the topology of the network is not affected. This is of great importance in networks which do not use data packet buffering, such as, for example, ETHERNET-type networks and 1BASE5 StarLAN systems.

Figure 2:
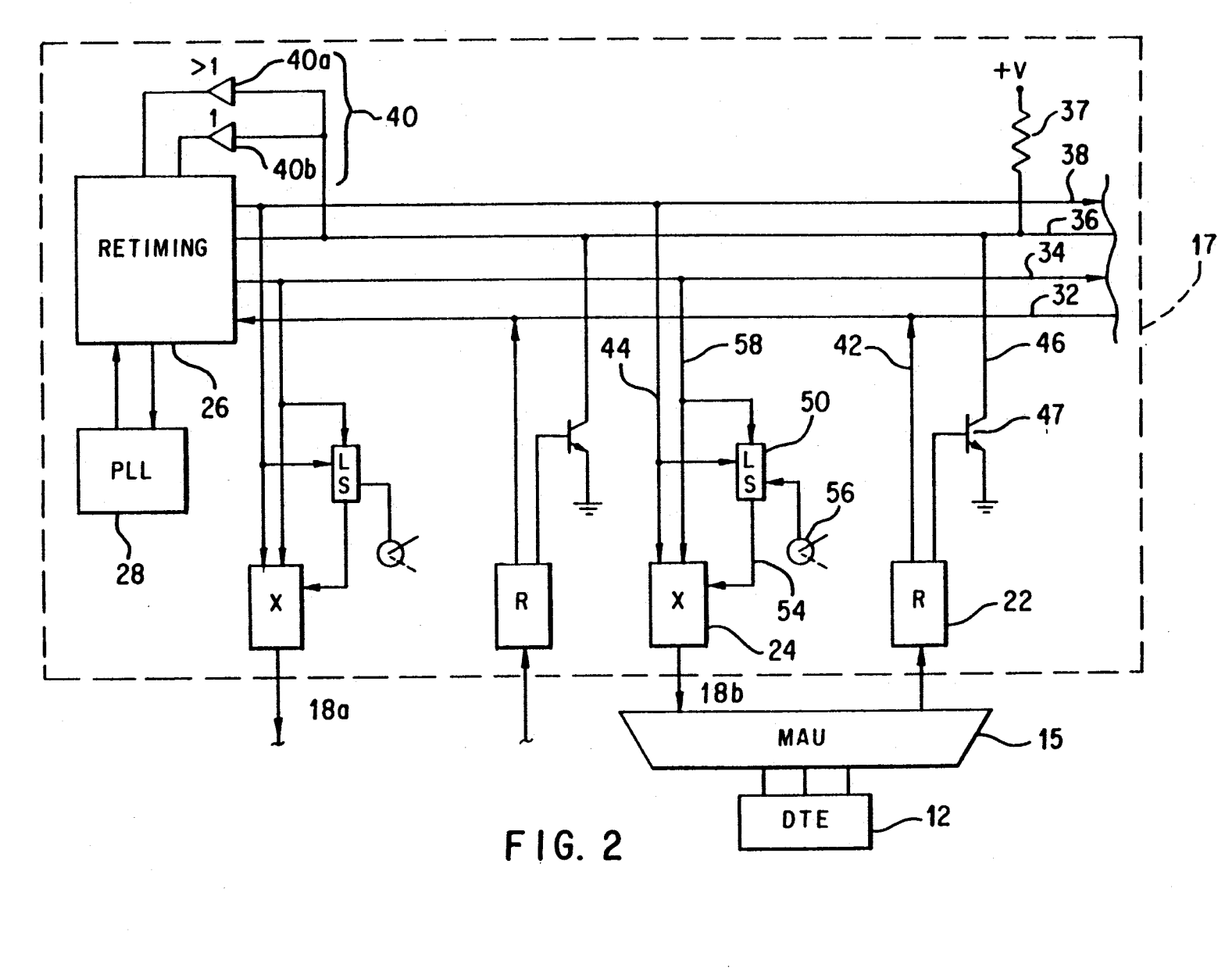
FIG. 2 is a simplified schematic diagram of one example of an active repeater unit including medium access units that is used in the network of FIG. 1 to carry out the present invention.

FIG. 2 is a block diagram of one example of an active repeater unit 17 attached to a DTE 12 through a MAU 15. For purposes of simplicity, a MAU 15 separate from the active repeater unit 17 is shown. The active repeater unit 17 includes a plurality of ports 18$_a$, 18$_b$ ..., each of which includes a receiver 22 and a transmitter 24. Receiver 22 receives data packets transmitted by its corresponding DTE 12. The data packet is carried via line 42 to a common receiving bus 32, which conveys the data packet to retiming means 26. The retiming means 26 works in connection with a phase lock loop (PLL) device 28 to separate a transmitted signal into a serial data stream and its clock (10 MHz). Retiming means 26 can include a FIFO (first-in-first-out) buffer, capable of storing a few (say 10) bits, to compensate for differences in transmission frequencies between different DTEs in the network and cover preamble extension time. The serial data stream is retransmitted by the retiming means 26 through a common transmit bus 34, while the clock signal (CLK) is output through a clock bus 38. The retransmitted data packet is received at each port transmitter 24 via its individual data line 58. In previous devices, the data packet would then be transmitted through every port except the port associated with the transmitting DTE. This is achieved using a conventional logic circuit provided in each transmitter 24 to filter out data packet transmissions when the receiver 22 of that port is also receiving the transmitted data packet. Once transmitted from a port, the data packets travel to each DTE in the network. While the DTEs theoretically do not process the data communication contained in data packets having a destination address different from the address of the DTE, once the data packet leaves the active repeater unit 17, there is no means for preventing a DTE from processing the data communication contained in data packets which are not addressed to that DTE. (For example, these DTEs could be "promiscuous" receivers that process all data regardless of the destination address, or foreign devices which have accessed the network unbeknownst to the network manager.)

It should also be noted that another active repeater unit could be attached to a port of active repeater 17 to form a repeatered network. This is done to increase the size of the network.

When more than one DTE attempts to access the network simultaneously, the retiming means 26 detects such a state, substitutes a collision signal for the data stream of a data packet, and transmits this collision signal through the common transmit bus 34. The collision state is detected in a conventional manner generally disclosed in the above-referenced U.S. Pat. No. 4,531,238 to Rawson et al. Each receiver 22 is attached via line 46 and transistor switch 47 to a bus 36. Bus 36 is attached to a source of voltage +V through a resistor 37. The gate of transistor 47 is attached to receiver 22. When a receiver 22 receives a signal from its DTE, gate 47 is closed so that the voltage on bus 36 drops by a predetermined amount towards ground. When more than one DTE attempts to access the network, the gates 47 in each of their ports are closed so that the voltage on bus 36 drops by a greater amount towards ground. A comparator section 40 determines whether zero, one, or greater-than-one DTE is attempting to access the network by comparing the voltage level on bus 36 with predetermined voltage levels. For example, a first comparator 40$b$ outputs a signal when the voltage on bus 36 is pulled down to the level corresponding to a single DTE accessing the network. Comparator 40$a$ outputs a signal when the voltage on bus 36 corresponds to a level where greater than one DTE attempts to access the network. The inputs of comparators 40$a$ and 40$b$ are supplied to the retiming means 26 to control whether retiming means 26 outputs the data packet (when only one DTE attempts to access the network) or a collision signal (when greater than one DTE attempts to access the network).

Thus, in a conventional communications network operating according to the CSMA/CD protocols, the active repeater unit outputs either: a carrier signal in the form of a data packet or a collision signal; or no signal (idle). Each DTE includes conventional hardware for monitoring the network medium so that: (a) the DTE refrains from transmitting data packets when there is carrier signal on the medium; (b) the DTE stops transmitting a data packet when it receives a collision signal, and transmits that data packet at a randomly selected later time; and (c) the DTE examines the address of incoming data packets and processes these data packets if addressed to that DTE.

The above disclosure describes conventional CSMA/CD networks prior to the present invention. As discussed above, a problem with these types of networks is that every DTE on the network can access all traffic on the network. The present invention provides logic for filtering the data stream output through each port of a repeater unit so that a transmitted data message only reaches DTEs to which it is intended. At the same time, the present invention outputs a spurious carrier signal to all other DTEs on the network so that they will be aware of traffic on the network, and thus will not attempt to access the network until transmission of the transmitted data packet is complete. If a carrier signal were not supplied to these other DTEs, they could attempt to access the network, causing the retiming means 26 to output a collision signal, interrupting the transmitted data packet.

Additionally, the present invention achieves this filtering function on a bit basis, as opposed to a data packet basis. This enables the present invention to operate in real time, a requirement for operation as an 802.3 specification repeater.

With reference to FIG. 2, each repeater port 18 includes a logic section (LS) 50 which determines whether the transmitted data packet is addressed to the DTE associated with that port. The logic section 50 receives the data stream transmitted to the transmitter 24 of its port in synchronism with the transmitter 24. Logic section 50 then compares the destination address of the transmitted data packet with the address of its DTE, and outputs a logic signal through line 54 to transmitter 24 based on this comparison. Transmitter 24 then uses the logic signal output on line 54 to either continue with transmission of the data packet (if the packet destination address matches) or to switch to transmission of a spurious signal (if the packet destination address does not match). In the illustrated example, the clock signal supplied on clock bus 38 is provided to the transmitter 24 via line 44. This clock signal 44 is used as the spurious signal, and therefore is substituted for at least the data portion of the data packet when logic section 50 determines that the transmitted data packet is not addressed to its DTE.

It is possible to use spurious signals other than the clock signal output on bus 38. For example, the transmitter 24 could be switched between the data signal and a jam signal based upon the output of logic section 50. As long as the spurious signal is synchronized with the data signal, it can be substituted for the data signal. Use of the clock signal is advantageous since it is synchronized with the data signal.

As discussed above, the destination address of the transmitted packet is compared to the address of the DTE associated with each port by logic section 50. The address of each DTE can be previously stored, (i.e., preprogrammed by the network manager) in each port's logic section 50. In one embodiment, the logic section 50 of each port can be switched into a LEARN mode by switch 56 so that logic section 50 can store the address of the DTE associated therewith. When in the LEARN mode, the logic section 50 examines the source address of a data packet transmitted by its DTE, and stores that source address as the address of its DTE. Switch 56 could be manual or computer controlled, and would be enabled by the network manager. Preferably, the active repeater unit 17 (or active concentrator 20) would be located in, for example, a locked telephone closet, and thus could only be switched into the LEARN mode by personnel having access to the telephone closet.

Figure 3:
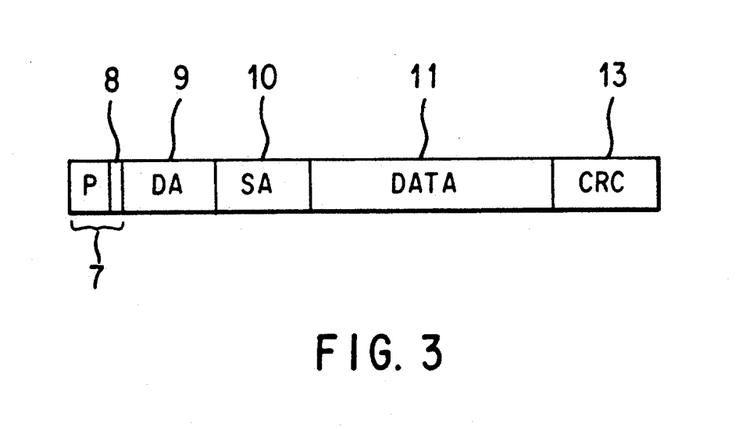
FIG. 3 is a signal wave form envelope illustrating a packet of data communicated through a network of the present example.

FIG. 3 illustrates the general contents of a data packet. Each data packet includes an initial preamble portion 7 which terminates in a start frame delimiter (SFD) 8. The start frame delimiter 8 is followed by a destination address portion 9 indicating the destination DTE of the data packet, a source address portion 10 indicating the source DTE of the data packet, a data communication portion 11, and an error code portion 13. Current industry standards utilize Manchester coded data streams having a preamble portion 7 including at least thirty-one "01" bit pairs followed by a single "11" bit pair as the SFD 8. The source address 10 and destination address 9 each have a length of 48 bits, for a combined address section having a length of 96 bits.

Figure 4:
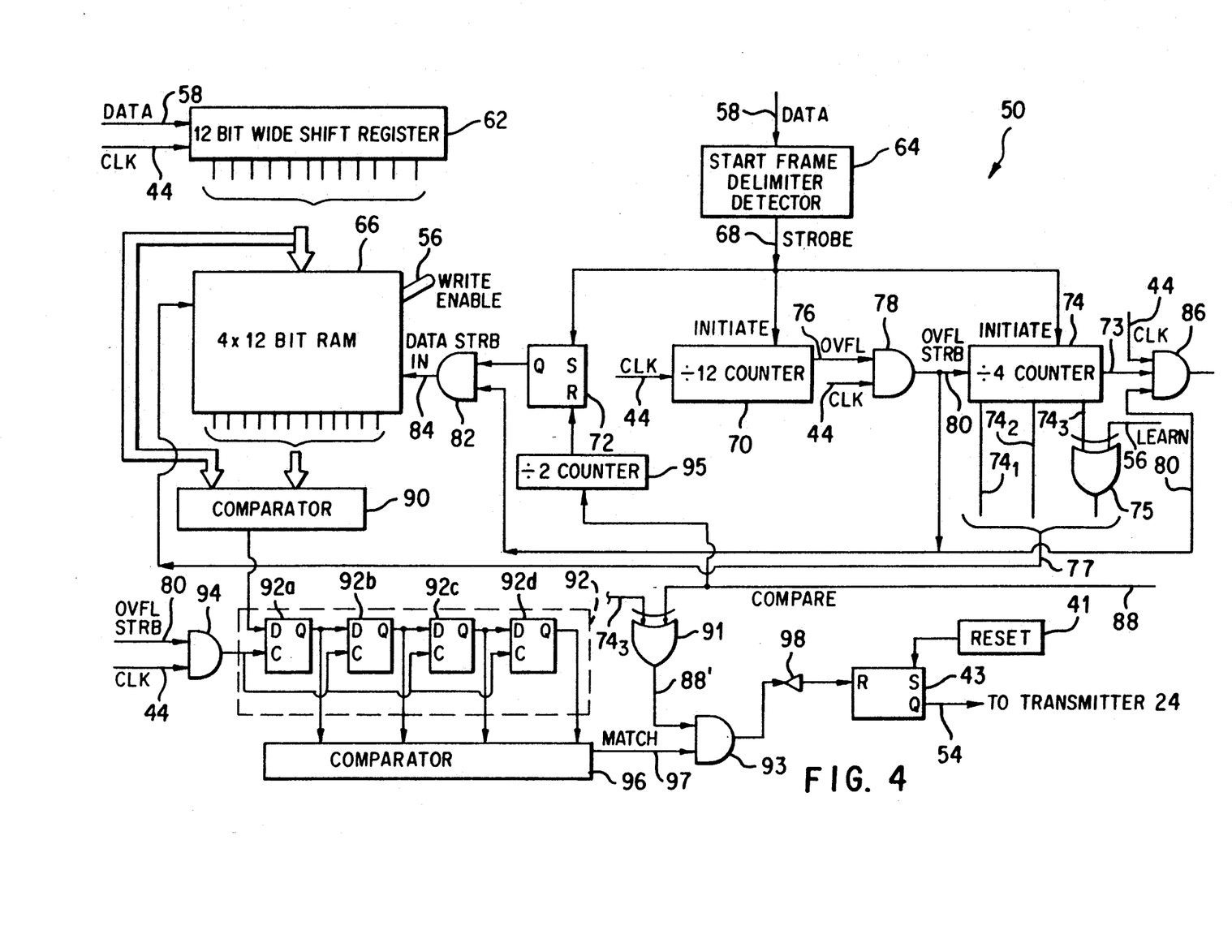
FIG. 4 is a block logic diagram illustrating one implementation of the port logic adapted for use with the system described in FIG. 2.

FIG. 4 illustrates one possible implementation of logic section 50. Logic section 50 would be provided on each port 18. The described example utilizes a 4×12-bit RAM 66 to store the 48 bit address of a DTE in four separate RAM locations, each having a length of 12-bits. Thus, bits 1–12 would comprise a first address word, bits 13–24 a second address word, bits 25–36 a third address word, and bits 37–48 a fourth address word. However, it is apparent that the present invention can be implemented by other means, such as by an application specific integrated circuit (ASIC). Additionally, it is understood that the FIG. 4 implementation would have to be modified if the arrangement and/or bit length of the data packet contents differed from the example illustrated in FIG. 3.

The logic circuit 50 illustrated in FIG. 4 is operable in two modes: a LEARN mode and a FILTERING mode. In the LEARN mode, the source address 10 of the DTE associated with a port is stored as four 12-bit words in the 4 by 12-bit RAM 66. In the FILTERING mode, the destination address 9 of a packet being transmitted through the network is compared to the stored DTE address to determine whether the transmitted data packet is intended for the DTE associated with that repeater port.

The circuit of FIG. 4 uses a 12-bit wide shift register 62 for temporarily storing each 12-bit word of address data. When in the LEARN mode, the four 12-bit address words which identify the DTE of a port are stored in four locations of RAM 66. When in the FILTERING mode, the four 12-bit words which make up the destination address 9 of a transmitted packet are compared with the four 12-bit words stored in RAM 66 to determine whether the data packet is addressed to the DTE associated with that port. A divide-by-12 counter 70 is used to determine when 12-bits have been received by shift register 62. The output of divide-by-12 counter 70 is used to trigger the input of a 12-bit word into RAM 66 (when in the LEARN mode), or (when in the FILTERING mode) to trigger the comparison (by comparator 90) of a 12-bit word previously stored in RAM 66 with a 12-bit word (part of a packet destination address) output from buffer 62. A divide-by-4 counter 74 is used to count the number of 12-bit words received by logic section 50 so as to indicate when the 48 bits of destination address have been received (thus indicating that it is time to determine whether a match has occurred between the address in memory 66 and the destination address of a packet). Counter 74 is also used to identify a location in memory 66 for inputting or outputting a 12-bit word (depending on whether operating in LEARN or FILTERING mode). Divide-by-4 counter 74 includes a 3-bit output (comprised by outputs $74_1$, $74_2$ and $74_3$) which is used to identify an address location in memory 66. Counter 74 is capable of identifying the following eight addresses in memory 66: 000, 100, 010, 110, 001, 101, 011, 111.

It should be noted that the data signal carried on common transmit bus 34 is input to logic section 50 and transmitter 24 via line 58. Accordingly, no delays are created in the transmission of data through the network. At the beginning of a data packet transmission from retiming means 26, the output of all logic sections 50 in the active repeater 17 are HIGH. This causes each port's transmitter 24 to continue transmitting the data signal input from line 58. Once the destination address 9 of a data packet has been input to logic section 50, the output 54 of logic section 50 goes LOW if the destination address does not match the address stored in logic section 50. The output 54 remains HIGH if there is an address match. By carefully designing the port logic so that any switching from data (on line 58) to a spurious carrier signal (in this example, the clock signal on line 44) takes place on a bit cell boundary, the carrier signal remains in phase with the packet. As an alternative, a one-bit delay can be provided to resynchronize the data stream.

The manner in which the destination address of a packet retransmitted by retiming means 26 is compared with a DTE address stored in RAM 66 (i.e., operation in the FILTERING mode) will now be described. When in the FILTERING mode, switch 56 is actuated so that data cannot be written into memory 66. Additionally, an input (56) into an exclusive OR gate 75 associated with the most significant bit (MSB) output $74_3$ of divide-by-4 counter 74 is made LOW so that the output of gate 75 corresponds to the value of MSB $74_3$. For purposes of illustration, assume the address of the DTE associated with logic section 50 has already been stored in RAM 66 as four 12-bit words at RAM locations 000, 100, 010, and 110, respectively. Since the destination address 9 is defined by the first 48 bits of the 96 bit address section, the first four 12-bit words in the address section 9 of a transmitted data packet need to be compared with the four 12-bit words at memory locations 000, 100, 010, and 110, respectively.

With reference to FIG. 4, the data stream 58 and clock 44 are supplied to the 12-bit wide shift register 62. Each bit of data supplied through data line 58 is stored in the first storage position of shift register 62. As each consecutive additional bit of data reaches shift register 62 the previously stored bit shifts to the next position in register 62. The data stream 58 is also supplied to a state machine 64 which acts as a start frame delimiter detector (SFDD). The start frame delimiter detector 64 becomes synchronized with the data stream (the SFDD has at least thirty-one "10" bit combinations of preamble to become synchronized prior to the "11" start frame delimiter 8). When the start frame delimiter 8 is detected by state machine 64, SFD detector 64 outputs a strobe signal 68 to flip flop 72, divide-by-12 counter 70 and divide-by-4 counter 74. At the same time, the start frame delimiter bit is stored in the first position of 12-bit wide shift register 62. Upon receipt of strobe signal 68, the Q output of flip flop 72 goes high. Additionally, divide-by-12 counter 70 and divide-by-4 counter 74 are initialized. Since divide-by-12 counter 70 also receives clock signal 44, as each bit of the address is received by the 12-bit wide shift register 62, the value of counter 70 is incremented by one.

After the receipt of 12 clock signals by counter 70, an overflow signal 76 is output by counter 70, and is combined with clock signal 44 at AND gate 78 to produce an overflow strobe signal 80. Overflow strobe signal 80 is input to divide-by-4 counter 74. Divide-by-4 counter 74 has a 3 bit RAM location defining output constituted by leads $74_1$, $74_2$, and $74_3$. Line $74_1$ corresponds to the least significant bit (LSB) in a RAM location, while line $74_3$ corresponds to the most significant bit (MSB) in the 3-bit RAM location. The MSB $74_3$ is gated with a LEARN signal 56 at exclusive OR gate 75. When in the address FILTERING mode, line 56 is LOW so that the output of gate 75 corresponds to the output on line $74_3$.

Thus, after the first overflow strobe signal 80 is supplied to counter 74, its output becomes "000". This output is supplied on line 77 to RAM 66 to define the location of the 12-bit word to be read from memory. The overflow strobe signal 80 is also supplied to AND gate 82. Since the output of flip flop 72 is high (from strobe signal 68), overflow strobe 80 causes gate 82 to produce a DATA IN strobe 84 so that the 12-bit word at location 000 in RAM 66 (the first 12-bits of the DTE address) are output to comparator 90.

Simultaneously with the output of the first 12-bit DTE address word from RAM 66, the 12-bits stored in shift register 62 are also supplied to comparator 90. These 12-bits correspond to the first 12-bits of the destination address 9 of the data packet being transmitted through the network. If the 12-bit word output from RAM 66 matches the 12-bit word supplied by shift register 62, comparator outputs a logic "1" to the first stage 92a of a 4-bit shift register 92. If no match occurs, a logic "0" is output to shift register 92. The loading of stages 92a-d of shift register 92 is controlled by the output of AND gate 94. Gate 94 outputs a LOAD signal each time it receives the overflow strobe signal 80 (which is combined with clock signal 44 at AND gate 94). Accordingly, the results of comparisons made by comparator 90 are only stored in shift register 92 after 12-bit blocks of address data are received by logic portion 50.

The process of outputting 12-bit words from RAM 66 to comparator 90 for comparison with subsequent 12-bit words supplied by shift register 62 continues until four comparisons have been made so that all four stages 92a, 92b, 92c and 92d of shift register 92 are loaded with logic "1"s or "0"s. Each time 12-bits are received by logic portion 50, shift register 62 is loaded with the next 12-bits in the destination address 9, and an overflow strobe signal 80 is produced by divide-by-12 counter 70. Each time overflow strobe signal 80 is produced, DATA IN strobe 84 is supplied to RAM 66 so that a 12-bit word, located at the RAM address defined by the 3-bit word 77 output from counter 74, is output from RAM 66. Thus, the second 12-bit word output from RAM 66 will have the address "100", the third word "010", and the fourth word "110".

After the four 12-bit words comprising the destination address 9 have been compared with the DTE address words stored in RAM 66, and the four results have been stored in shift register 92, a determination is made as to whether a match has occurred. Comparator 96 determines whether each stage 92a-d of shift register 92 contains a logic "1" (indicating that a match has occurred). If a match occurs, the MATCH signal output by comparator 96 on line 97 goes HIGH. If no match occurs, a LOW signal is output on line 97. The signal on line 97 is supplied to AND gate 93, for use as described below.

After receiving four overflow strobe signals 80 (indicating that the 48 bit destination address 9 of a data packet being transmitted through the network has been received), divide-by-4 counter 74 outputs a signal along line 73 which is gated with clock signal 44 and overflow strobe signal 80 at AND gate 86 to produce a COMPARE signal 88. COMPARE signal 88 is gated with the MSB $74_3$ at exclusive OR gate 91 to output a signal 88'. Exclusive OR gate 91 ensures that a match comparison is made only after the destination address 9 of a data packet is received by logic portion 50, not after the next 48 bits of address (the source address 10 of a data packet) are received by logic portion 50. Since the logic section 50 remains active after input of the destination address (in order to store the source address of the DTE on that port when in the LEARN mode— this will be described below) a second COMPARE signal 88 will be output by counter 74 after the 48 bit source address 10 of a data packet being transmitted through the network is received by logic portion 50. However, the second COMPARE signal 88 will not result in the output of a signal on line 88' because MSB $74_3$ will be HIGH when the second COMPARE signal 80 is supplied to exclusive OR gate 91, resulting in no output from gate 91.

The HIGH signal output on line 88' after receipt of destination address 9 is gated with the MATCH signal output from comparator 96 on line 97 at AND gate 93. If there was a match between the data packet destination address 9 and the DTE address stored in RAM 66, the MATCH signal will be high, and the output of AND gate 93 will be high. Otherwise, AND gate 93 will output a LOW signal. The output of AND gate 93 is inverted by inverter 98, and supplied to the reset terminal R of a flip-flop 43. The output 54 of flip-flop 43 (which is also the output of logic portion 50) is made HIGH upon the receipt of a RESET signal from RESET signal generator 41. The RESET signal is generated at the end of a data packet transmission based upon a determination that there is no carrier on the network. This can be accomplished, for example, based upon the voltage level on bus 36. Thus, when a data packet is initially transmitted through active repeater unit 17 by its retiming means 26, the output 54 of each port's logic section 50 is HIGH, and the initial portions of the data packet (the preamble 7 and destination address 9 are output through each data port). After the 48 bit data packet destination address 9 is received by logic section 50, the output of inverter 98 is used to change the output of flip-flop 43 if a match did not occur between the data packet destination address 9 and the stored DTE address. Specifically, if there is no match, AND gate 93 output is low so that inverter 98 supplies a HIGH signal to the R input of flip-flop 43, causing flip-flop output 54 to go LOW. If there is a match, AND gate 93 output is HIGH so that inverter supplies a LOW signal to the R input of flip-flop 43, resulting in the output of flip-flop 43 remaining HIGH.

Figure 5:
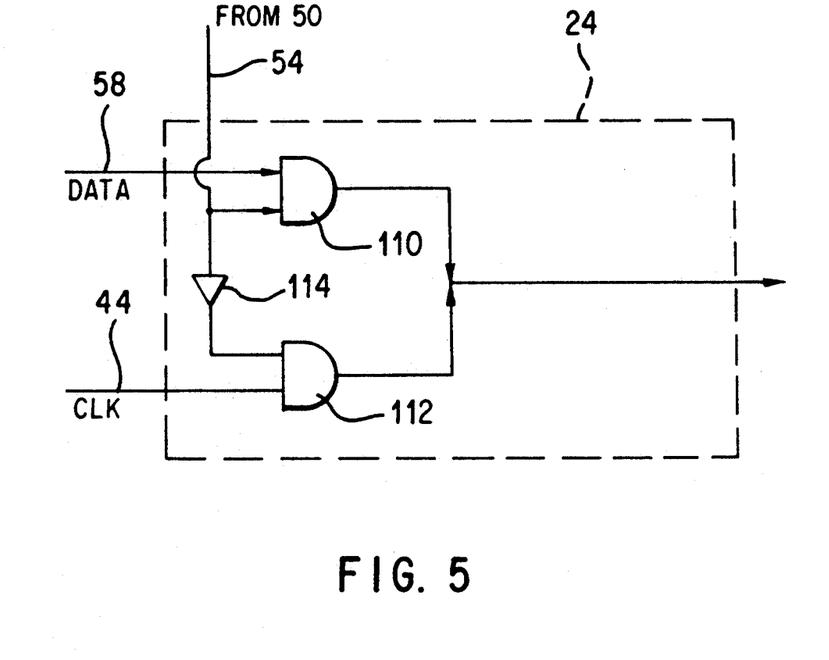
FIG. 5 is a block logic diagram of a transmitter port of the repeater unit illustrated in FIG. 2.

FIG. 5 illustrates the manner in which the logic signal (high or low) 54 supplied from logic portion 50 is used in transmitter 24 to output either the data signal from line 58 or the clock signal from line 44. Transmitter 24 can have, for example, two AND gates 110 and 112. The logic signal 54 provided from logic portion 50 is supplied to AND gate 110. The logic signal 54 is also inverted by inverter 114 prior to being supplied to AND gate 112. It will be recalled that logic signal 54 is high at all times if there is a match between the destination address of a transmitted data packet and the DTE associated with that repeater port. Logic signal 54 is LOW after transmission of the destination address 9 if the destination address of the data packet does not match the address of the DTE associated with that port. Since logic signal 54 is supplied to AND gate 110 and is inverted prior to being supplied to AND gate 112, the output of AND gate 110 will always correspond to the data signal on line 58 when logic signal 54 is HIGH, while the output of AND gate 112 will be low when logic signal 54 is HIGH (since logic signal 54 is inverted prior to receipt by AND gate 112). When logic signal 54 goes LOW, the data signal on line 58 will not be output from AND gate 110, while clock signal 44 will be output from AND gate 112. The outputs of AND gates 110 and 112 are combined to form the output of transmitter 24.

It is understood that a d-Flip-Flop is generally provided at the output of transmitter 24, to sample and hold this output for one clock time so that changes take place on a bit cell boundary. Additionally, conventional circuits for converting the NRC output of transmitter 24 to Manchester coding is also generally provided.

The manner in which the address of a DTE attached to a repeater port can be stored in memory 66 of logic section 50 will now be described.

As stated earlier, storage of DTE addresses into the logic sections 50 of their corresponding repeater ports can be controlled by the network manager so that only authorized DTEs will receive network traffic addressed to those DTEs. Unauthorized personnel will not have access to the DTEs on the network because the repeater unit 17 or active concentrator 20 of the present invention will not transmit data to DTEs on the network unless: (1) the data is addressed to that DTE; and (2) the port to which the DTE is attached "knows" the address of the attached DTE. Additionally, DTEs registered with the network will not have access to data traffic not intended for them.

The logic section 50 in FIG. 4 can be operated in the LEARN mode when it is desired to store the address of a DTE attached to a repeater port in the logic section 50 of that repeater port. When the in the LEARN mode, the logic section 50 stores the source address of a data packet transmitted by its associated DTE in its memory (RAM 66) so as to "learn" the address of the DTE attached thereto. When in the LEARN mode, the FIG. 4 circuit operates in a manner similar to the above described FILTERING mode except DATA IN STROBE 84 causes a 12-bit word located in shift register 62 to be stored in a RAM location defined by the 3-bit word output along line 77 by counter 74. As described above, a DTE address in the present example is stored as four 12-bit words at locations 000, 100, 010 and 110 in RAM 66. However, since the address of the DTE associated with a repeater port appears as the source address 10 in packets transmitted from that DTE, the four 12-bit words to be stored in RAM 66 are actually 12-bit words 5-8 in the address section (sections 9 and 10) located after SFD 8. Accordingly, in the present example, the 3-bit RAM location output on line 77 by counter 74 is modified when in the LEARN mode so that the source address of the transmitting DTE associated with a repeater port is stored at locations 000, 100, 010 and 110 of RAM 66. This is accomplished by supplying a HIGH signal through line 56 into exclusive OR gate 75 at MSB output $74_3$ when in the LEARN mode. This causes the signal output from gate 75 to be the inverse of signal $74_3$ when in the LEARN mode. Thus, the first four 12-bit words in the data packet transmitted by a DTE associated with a repeater port (the destination address 9 of a data packet) are discarded, while the four 12-bit words of the source address 10 are stored in RAM locations 000, 100, 010 and 110.

Each time divide-by-4 counter 74 outputs COMPARE signal 88 (i.e., after 48 bits of address are received), divide-by-2 counter 95 is incremented by one. Thus, after the source address 10 is stored in RAM 66, divide-by-2 counter 95 will have received two signals along line 88, and therefore outputs a signal to the R input of flip-flop 72. This causes the output from flip-flop 72 to go LOW so that no further information can be stored in RAM 66.

Thus, in order to store the address of a DTE in the logic section 50 of each repeater port, a data packet is output by a DTE attached to a port while switch 56 for that port is in the LEARN position. This enables writing of information into RAM 66, and supplies a HIGH signal to exclusive OR gate 75. Switch 56 can be actuated manually or electronically. If control of the actuation of switch 56 is limited to only authorized personnel (such as the network manager) only registered DTEs will be able to receive information over the network.

Broadcast packets (packets intended for all DTEs on the network) would not be blocked. Broadcast packets contain a distinctive address portion which would be utilized to override the filtering process performed by the logic sections 50.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An active repeater unit for use in a data communications system of the type having a communicating medium, and a plurality of data stations attached to the communicating medium, each data station capable of: monitoring the medium to sense whether a carrier signal is present on the medium, transmitting carrier signals in the form of data packets onto the medium only when no carrier signal is sensed on the medium, and receiving data packets communicated onto the medium by another data station; each data packet including a destination address portion identifying the data station at which the data packet is intended to be received, and a source address portion identifying the data station which transmitted the data packet, said active repeater unit comprising:
   a) a plurality of port means for receiving and transmitting the data packets placed on the communicating medium by the data stations, each of said port means being attachable to a corresponding data station;
   b) retiming means for receiving the data packets received by each port means, for retransmitting said received data packets as a serial data stream to each of said port means, and for transmitting a clock signal in parallel with said serial data stream to each of said port means; and
   c) wherein at least one of said port means includes logic means for:
      i) determining whether the destination address of data packets received as said serial data stream by said active repeater unit match the address of the data station attached to said at least one port means; and
      ii) transmitting said data packet to the data station attached to said at least one port means when the determination made in (i) is a match, otherwise transmitting said clock signal to the data station attached to said at least one port means.

2. The active repeater unit of claim 1, wherein said serial data stream contains said destination address portion located prior to a data communication portion of said serial data stream, and wherein said logic means makes said match determination before said data communication portion of said data stream is received by said logic means.

3. The active repeater unit of claim 1, wherein all of said port means other than said at least one port means includes a corresponding logic means for:
   i) determining whether the destination address of data packets received by said active repeater unit match the address of the data station attached to each corresponding port means; and
   ii) transmitting the data packet to the data station attached to the corresponding port means when the determination made in (i) is a match, otherwise transmitting the clock signal to the data station attached, to the corresponding port means.

4. The active repeater unit of claim 3, wherein each of said logic means are selectively operable in either:
   a) a learning mode where said logic means stores the source address of data packets transmitted by the data station attached to its corresponding port means in order to learn the address of said attached data station; or
   b) a filtering mode where said logic means determines whether said match occurs between the destination address of a transmitted data packet and the address of the data station attached to its corresponding port means, and selectively transmits said data packet or said clock signal to said data station based on said determination; and further comprising:
   switch means for switching each said logic means between said learning mode and said filtering mode.

5. An active repeater unit for use in a data communications system of the type having a communicating medium, and a plurality of data stations attached to the communicating medium, each data station capable of: monitoring the medium to sense whether a carrier signal is present on the medium, transmitting carrier signals in the form of data packets onto the medium only when no carrier signal is sensed on the medium,, and receiving data packets communicated onto the medium by another data station; each data packet including a destination address portion identifying the data station at which the data packet is intended to be received, and a source address portion identifying the data station which transmitted the data packet, said active repeater unit comprising:
   a) a plurality of ports, each port being attachable to a respective data station, and having:
      i) a receiver for receiving data packets from its respective data station; and
      ii) a transmitter for transmitting data packets received from other ports of said active repeater unit to its respective data station;
   b) retiming means, attached to the receiver and transmitter of each port, for:
      i) receiving the data packets transmitted from the receiver of each port,
      ii) retransmitting the received data packets as a serial data stream containing said destination address portion located prior to a data communication portion of said serial data stream to the transmitter of each port, and
      iii) transmitting a clock signal of the retransmitted data packet to the transmitter of each port; and wherein each port also includes:

logic means, attached to said retiming means so as to receive said retransmitted data packets, and also attached to the transmitter of its corresponding port so that the serial data stream simultaneously reaches said logic means and said transmitter, for determining whether the destination address of data packets retransmitted by said retiming means match the address of the data station attached to said corresponding port before said data communication portion of said data stream is received by said logic means so that a section of said retransmitted data packet up to at least said destination address portion, but prior to said data communication portion, is always transmitted by each transmitter before said match determination is made by each respective logic means, and for outputting a match signal to said transmitter until said logic means determines that no match occurs; and wherein each transmitter transmits said retransmitted data packet to its respective data station as long as said match signal is output by said logic means, otherwise transmits said clock signal.

6. The active repeater unit of claim 5, wherein each of said logic means is selectively operable in either:

a) a learning mode where said logic means stores the source address of data packets transmitted by the data station attached to its corresponding port in order to learn the address of said attached data station; or b) a filtering mode where said logic means determines whether said match occurs between the destination address of a transmitted data packet and the address of the data station attached to its corresponding port, and selectively transmits said data packet or said determination; and further comprising: switch means for switching each said logic means between said learning mode and said filtering mode.

* * * * *